UNITED STATES PATENT OFFICE.

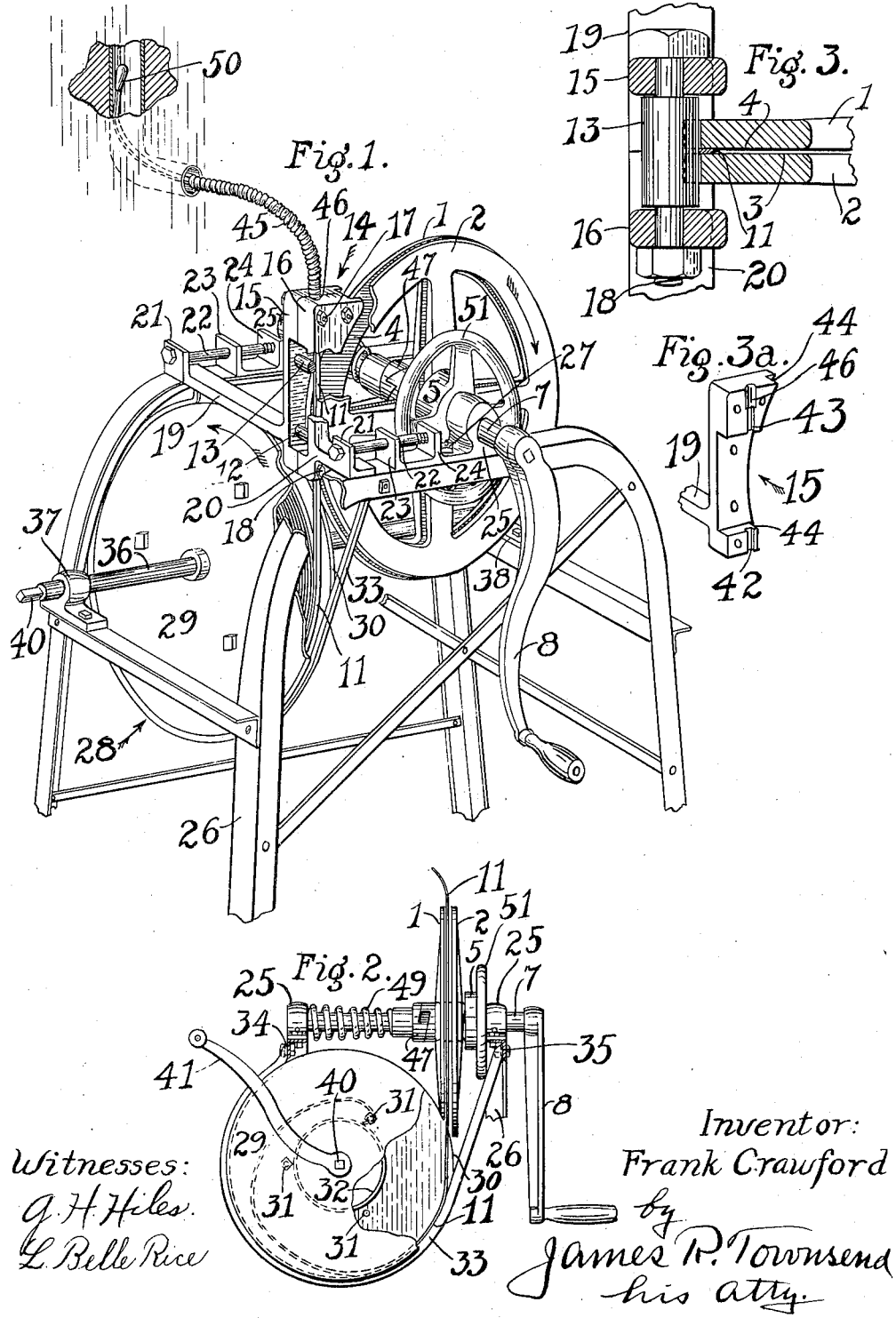

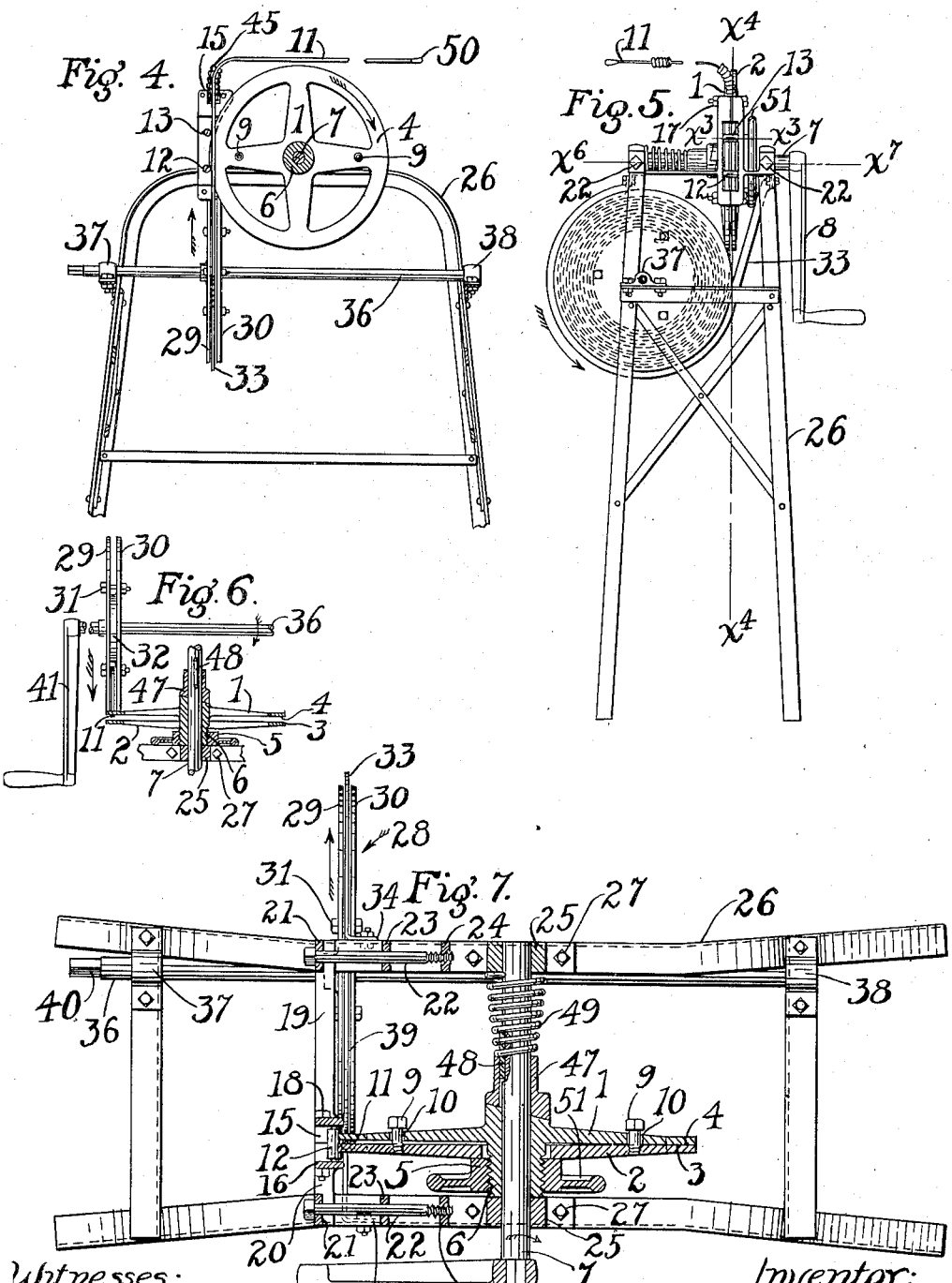

FRANK CRAWFORD, OF PASADENA, CALIFORNIA, ASSIGNOR TO CONDUIT THREADING DEVICE CO., OF PASADENA, CALIFORNIA, A CORPORATION OF CALIFORNIA.

CONDUIT FISH-WIRE MACHINE.

1,038,093.      Specification of Letters Patent.      Patented Sept. 10, 1912.

Application filed September 10, 1909. Serial No. 517,155.

*To all whom it may concern:*

Be it known that I, FRANK CRAWFORD, a citizen of the United States, residing at Pasadena, in the county of Los Angeles and State of California, have invented a new and useful Conduit Fish-Wire Machine, of which the following is a specification.

This invention relates to that type of machines for inserting wires or conductors in conduits, wherein a fish-wire is first driven or fed through the conduit in one direction, after which the wire or conductor to be laid in the conduit is attached to the protruding forward end of the fish-wire which is then withdrawn from the conduit in a direction opposite to that first taken, thereby pulling the wire or conductor through the conduit and into its ultimate position. The fish-wire, as it is termed, is well adapted, by reason of its shape and general character, to pass through bends and angles in the conduits through which it would be impossible to force the wire or conductor itself, and hence with a fish-wire of the proper type, a rapid and generally satisfactory installation of electrical conductors and the like can be had if proper means are provided for driving ahead the fish-wire with sufficient positiveness, force and speed, and for retracting the fish-wire. Heretofore, however, the means adapted for the operation of the fish-wire have not given satisfactory results. The prior constructions have usually embodied feed rollers or the like between which the fish-wire was fed forward, and these devices have the disadvantage that they not only fail to grip the fish wire sufficiently to drive the same ahead in a rapid and positive manner, but that they do not permit of easy and effective adjustments or alterations of the gripping action such as will produce the best results in a given instance.

The primary object of the present invention is to avoid these defects and to furnish a machine in which the fish-wire may be moved very rapidly in either direction through underground conduits or those in buildings and the like, for the purpose above indicated, regardless of the twists, turns or angles that exist in the said conduits. As electrical conductors or the like can thus be installed in bent or angular conduits in a surprisingly easy fashion and in a remarkably short time, it is manifest that the machine is peculiarly well adapted for the wiring of buildings and similar structures.

The novel features of the invention will appear clearly from the following description and claims.

In the accompanying drawings:—Figure 1 is a perspective view of a machine embodying the invention, showing the fish-wire in the course of its insertion into a conduit of a building wall; Fig. 2 is a detail view of the clamp and the fish-wire spool; Fig. 3 is an enlarged horizontal section through one edge of the clamp and the fish-wire guide; Fig. 3$^a$ is a detail perspective view of a portion of the fish-wire guide; Fig. 4 is a vertical longitudinal section on line $x^4$—$x^4$ of Fig. 5; Fig. 5 is an end elevation of the machine showing the fish-wire wound on its spool; Fig. 6 is a detail top view, partly in section, of the clamp and spool, and Fig. 7 is a horizontal longitudinal section of the machine taken through the upper portion thereof, on line $x^6$—$x^7$ of Fig. 5.

The machine comprises a supporting frame 26 which is preferably made up of angular side members or frames suitably tied together by struts and braces, as shown, although it is to be understood that the construction of the frame is immaterial to the invention. Journaled transversely in bearings 25, bolted to the tops of the side frames by bolts 27, is a rotary shaft 7 adapted to be rotated by a detachable hand crank 8 and which carries a wire driving or feeding member shown as comprising a clamp 1, 2 made up of opposing disks or plates between the edges of which the fish-wire is gripped. At the peripheries of the clamp sections or members 1, 2, the latter are provided with inner opposing gripping faces 3, 4 of annular shape, and it is between these gripping faces that the fish-wire is introduced for feeding and retracting the same. I find it expedient to make one or both of the clamp members 1, 2 of a yielding character so that their peripheral wire-gripping portions may be maintained at a fixed distance apart throughout the circumference of the clamp. The relative angular displacement of the two clamp members is prevented by means such as the bolts 9 which pass freely through openings 10 in one member into threaded engagement with the other, as shown. In order to make the machine as light as possible and therefore easily portable, the clamp members are preferably provided with cut-out portions, as illustrated, so that they present the form of spoked wheels, and it will be seen that under these circumstances the fastening members 9 are passed through the spokes. The distance between the opposed wire-gripping faces 3, 4 is controlled by means of a nut 5 which bears against one of the clamp members, such as 2, and is threaded on a hub such as 6, which, in the embodiment illustrated, is formed integral with the clamp member 2. In order to facilitate the operation of the nut 5, the same may be equipped with a hand wheel 51, as indicated. It is obvious that by rotating the hand wheel in one direction the opposing faces of the clamp structure will be forced toward each other, to grip the fish-wire to the required extent, while an opposite movement of the hand wheel will result in the separation of the two disk-like clamping elements.

In the embodiment illustrated, the clamp member 2 is freely movable about the shaft 7 and is driven by means of the connections 9 from the clamp member 1, and also by what frictional contact exists between the nut 5 on the member 1 and the portion of said member 2 which is in contact with said nut. The member 1 is adapted to be driven in one direction by the rotation of the shaft 7, and this is effected by a clutch 47 which permits said shaft to be moved in the opposite direction without moving the clamp. The clutch 47 is preferably of the ratchet type and comprises a toothed portion on the member 1, coacting with a toothed sleeve, which is keyed to the shaft 7 by a key 48 and is urged toward the member 1, by a spring 49 suitably arranged around said shaft 7. While this clutch arrangement is of considerable advantage in some instances, as will hereinafter appear, it is not essential to the purposes of the invention when the broader aspects of the latter are considered.

As previously intimated, the fish wire to be driven through the conduit is fed between the gripping faces 3, 4 of the clamp, and it is forced into the conduit by the rotation of the latter element. In the machine illustrated, the fish-wire 11 is stored on a spool 28 made up of cheeks 29, 30 mounted on a shaft 36 extending at right angles to the shaft 7 and somewhat below the same, said shaft 36 being journaled in suitable bearings 37, 38 at the ends of the machine frame, and adapted for rotation by the same detachable crank 8 which is used in connection with the clamp shaft. The fish-wire 11 is coiled spirally on the spool 28 between the cheeks 29, 30, one end of said wire being attached to the spool by a hook engaging a bolt 31 extending between the spool cheeks, or by any other suitable expedient. A plurality of bolts 31 are preferably employed to clamp the spool cheeks against the hub 32 of the spool. In order to confine the fish-wire in the space between the cheeks of its spool, I may employ a strap-like guard 33 which is bent around the spool and conforms to the same as shown in Fig. 2, the ends of said guard being attached to the machine frame as indicated at 34 and 35 respectively.

The fish-wire is fed to the clamp from the spool tangentially of the former, and that portion of the wire which extends between the peripheral or edge portions of the clamp sections 1, 2 in a direction approximately tangential to the circumference of the clamp, is gripped between the two opposing surfaces 3, 4, as previously explained. In order to insure the proper engagement of the wire with the clamp in this fashion, I use a guide in connection with the clamp which holds the wire and confines it in its proper place between the surfaces 3, 4. As preferably constructed, this guide (14) embodies two upright parallel cheeks 15, 16 on the machine frame, that abut each other and are bolted together at their upper and lower ends by means of bolts 17, 18 respectively, the opposing faces of the cheeks at those points, viz., at the top and bottom of the guide, being suitably grooved or notched to enable the fish-wire to pass between them, as will hereinafter appear. The intermediate portions of the cheeks or guide blocks are cut away to accommodate transverse lower and upper rollers 12, 13 which are arranged one above the other in a plane substantially tangential to the clamp. The axes of said rollers, which latter are suitably journaled at their ends in the opposing faces of the guide blocks, are directed parallel to the clamp axis. At the side of the guide which is directed toward the clamp, said guide is cut away as at 44 to present rabbets which conform to the edges of the respective clamp members and into which said edges enter. It will therefore be understood that when the fish-wire is drawn from its spool through grooves 42, 43 formed at the inner faces of the lower and upper portions, respectively, of the guide blocks or cheeks, such wire will pass between the gripping surfaces of the clamp in the manner indicated in Figs. 1 and 3, and it will be prevented from bending away from the clamp and out of a substantially straight line by means of the rollers 12, 13, which abut the outer part of the wire, as shown, and roll in contact therewith. From the guide just described the fish-wire passes out of the machine through a flexible device such as the hollow tube 45, one end of which is clamped between the guide blocks 15, 16 in notches 45, while the opposite end is intended to be introduced in the conduit in substantially the manner indicated in Fig. 1.

It is sometimes advisable and even necessary to adjust the guide 14 toward and away from the clamp, viz., in a direction substantially radially thereof, and to that end the following mechanism is provided: The blocks 15, 16 of the guide are provided at their lower ends with laterally directed brackets or bars 19, 20 respectively, the outer ends of which rest on the tops of the respective side frames of the machine. Each of the bars 19, 20 is provided with a guide lug 21 through which bolts 22 are extended in the direction of the clamp axis, said bolts 22 also being extended through lugs 23 on the clamp bearings 25 and threaded at their ends into other lugs 24, also on said clamp bearings. It will be understood, therefore, that by screwing up the heads of the bolts 22 the bars 19, 20 will be moved along the machine frame toward the clamp axis, carrying with them the respective sections of the guide 14, which is thereby moved into closer proximity to the edge of the clamp, as will be understood. It is manifest, of course, that this specific adjustment of the guide forms no part of my invention and various devices for obtaining the same result may be used. Obviously, the turning of the bolts 22 in a direction opposite to that first indicated will permit the guide to be moved away from the clamp. When the parts are in the position shown in Fig. 1, the fish-wire moves over the gripping faces 3, 4 through a comparatively short distance, but it is evident that if the guide were adjusted to the right with reference to that view, such distance would be considerably increased and the gripping effect of the clamp on the wire augmented proportionately.

The operation of the improved machine is substantially as follows:—The fish-wire 11, which is preferably flat, and is usually provided at its forward or free end with a knob 50 to enable it to pass through bends or turns in the conduit, is ordinarily wound spirally on the spool 28 when the machine is not in use, as shown in Fig. 5. When the parts are in this position the knob 50 projects slightly out of the tube or manipulating handle 45, and when it is desired to place a wire or conductor in a conduit said knob is introduced into the mouth of the latter, after which the clamp 1, 2 is rotated in the direction of the arrow (Fig. 1), the crank 8 being attached for this purpose to the end of the clamp shaft 7. In order to produce a proper feed or driving of the fish-wire, it is gripped to the necessary extent between the substantially flat gripping surfaces 3, 4 of the clamp, for which purpose the hand wheel 51 of the nut 5 is properly adjusted in the manner heretofore explained. The rotation of the clamp will then obviously unwind the fish-wire from the spool and the guide 14 and its appurtenances will necessitate a driving or feeding of the wire in a direction tangentially of the clamp, whence it passes through the flexible tube 45 and into and through the conduit. The knob 50 causes the forward end of the fish-wire to curve around in any angles or bends that may exist in the conduit, and these latter will therefore not interfere with the rapid driving ahead of the wire. The operation proceeds as indicated until the knob 50 protrudes from the opposite end of the conduit. It is desirable in some cases to produce a hammer-like action on the fish-wire in order to drive it into the conduit with sufficient force, and this is produced by means of the clutch 47 previously described. Said clutch rotates the clamp positively in the direction of the arrow (Fig. 1) but permits the crank 8 to be moved backward, viz., in the opposite direction, without pulling the wire back from the position into which it has advanced. The crank can then be moved forcibly in its original direction with a hammer-like impulse which will cause the clutch to be reëngaged and will urge the clamp in its original direction with considerable force. In this manner, the handle acts as a hammer to drive the wire forward, and at the same time the handle may be operated in a comparatively small space, as will be understood. When the fish-wire is driven forward to the position previously indicated, the wire to be laid in the conduit is attached to the free end of said fish-wire, and the hand wheel 51 is then so manipulated as to discontinue the gripping action of the clamp on the fish-wire. The crank 8 is then transferred from the shaft 7 to the seat 40 on the end of the spool shaft 36, and the machine is then ready to rewind the fish-wire on its spool and thereby pull the other wire through the conduit in a direction opposite to that first taken by the fish-wire. This winding up of the fish-wire can, of course, be easily effected, and when the same is restored to its original position (Fig. 5), the other wire will be found in its proper ultimate position in the conduit, after which the two wires are disconnected from each other. Obviously the length of the fish-wire on the spool must correspond with that of the longest conduit to be threaded with wire, and manifestly also, different lengths of the fish-wire will have to be unwound and rewound as called for by the lengths of the several conduits.

In some machines, the position of the parts as shown in Fig. 1 may be reversed in order that the fish-wire may be forced downward from the machine into an underground conduit or the like; and of course it is also possible to arrange the machine to drive the fish-wire in a sidewise direction, or, in fact, in any direction desired. It will be understood also that while I prefer to use a flat fish-wire of the type described, other kinds of fish-wire may be employed with good results.

It will be obvious that, broadly considered, the fish-wire spool and the clamp form rotary single axis devices for moving the fish-wire in opposite directions respectively. When moving the wire in one direction, the crank or its equivalent is used in connection with one of the rotary devices while when the wire is to be moved in the opposite direction it is used in connection with the other of the rotary devices. The guide interposed between the two devices is, of course, operative in both cases, i. e., when the fish-wire is moved in either direction. The general arrangement of the parts as just mentioned is original with myself, in so far as I am aware, and my claims in this connection should be interpreted accordingly.

Of course I have not attempted to describe the numerous modifications of the structure that may be made without departing from the invention; the foregoing description is detailed in so far as it concerns the machine shown in the drawing, but it is evident that the scope of my inventive idea is to be gathered from the appended claims.

What I claim is:—

1. In a conduit fish-wire machine, a frame, means to store the fish-wire thereon, and a single-axis rotary clamp on the frame with respect to which such fish-wire is fed tangentially.

2. In a conduit fish-wire machine, a frame, a rotary device rotatable about a single axis in said frame and having means at its periphery to clamp the fish-wire, and means to store a fish-wire in operative relation to said device.

3. In a conduit fish-wire machine, a supporting frame, a fish-wire spool journaled therein, and a device on the frame rotatable about a single axis and having peripheral wire clamping means through which the fish-wire is passed from said spool tangentially of the device.

4. In a conduit fish-wire machine, a supporting frame, a fish-wire spool journaled therein, a rotary single axis driving device on the frame having peripheral wire clamping means which receives the fish-wire from said spool and feeds the same forward, and a device which delivers the fish-wire from said driving device in a substantially tangential direction.

5. In a conduit fish-wire machine, a portable frame, a rotary single axis driving device on said frame having wire-gripping means which engage the fish-wire at opposite points and pushes the same into the conduit, and means associated with said driving device for guiding the fish-wire in a predetermined path with respect to the latter.

6. In a conduit fish-wire machine, a portable frame, a rotary driving device thereon having wire-gripping means comprising opposing substantially flat gripping surfaces which push the fish-wire into the conduit, and means to hold the fish-wire in operative engagement with said gripping means.

7. In a conduit fish-wire machine, means for storing the fish-wire, a rotary driving device having coaxial members between which the fish-wire is gripped, and means to conduct said wire from said storing means between said gripping surfaces, and deliver it from said driving device in a substantially tangential direction.

8. In a conduit fish-wire machine, a rotary device having a single axis of rotation and equipped with wire gripping means, means for storing a fish-wire in operative relation to said device, means for guiding the fish-wire from said storing means to said device and maintaining it in proper engagement therewith, and means to alter the gripping action of said device on the wire.

9. In a conduit fish-wire machine, a clamp rotatable about a single axis, means for storing a fish-wire in operative relation to said clamp, means for guiding the fish-wire from said storing means to said clamp and maintaining it in proper engagement therewith, and means to impart hammer-like turning impulses to the clamp.

10. In a conduit fish-wire machine, means for storing the fish-wire, a rotary driving device having opposed surfaces substantially at right angles to the axis of said device and between which the fish-wire is gripped, means to conduct said wire from said storing means between said gripping surfaces, means to retain the wire between said surfaces and deliver it from said driving device in a substantially tangential direction, and means for altering the gripping effect of said driving device on the wire.

11. In a conduit fish-wire machine, a frame, a fish-wire spool journaled therein, and a rotary single axis wire driving clamp journaled in said frame at right angles to said spool.

12. In a conduit fish-wire machine, a frame, a fish-wire spool journaled therein, a single axis rotary clamp to which the fish-wire is delivered tangentially from said spool, and means adapted to be used in connection with either said clamp or said spool to rotate the same directly and positively in the desired direction.

13. In a conduit fish-wire machine, a fish-wire spool, a single axis rotary wire driving clamp to which the fish wire is fed tangentially, and a single crank adapted for use in connection with either said spool or said clamp, to rotate the same in the desired direction.

14. In a conduit fish-wire machine, a frame, a fish-wire spool journaled therein, a rotary single-axis wire driving clamp journaled in the frame, a guide device associated with said clamp, and a flexible tube extending from said guide device and through which the fish-wire is driven by the clamp.

15. The combination with the frame of a conduit fish-wire machine, and a rotary clamp journaled therein, of means for imparting hammer-like turning impulses to said clamp.

16. In a conduit fish-wire machine, a rotary clamp to feed the fish-wire into a conduit, a clutch associated with said clamp, and means coacting with said clutch to impart hammer-like impulses to the clamp.

17. In a conduit fish-wire machine, a rotary clamp having opposing substantially flat surfaces to grip the fish-wire, and a guide to conduct the fish-wire between said surfaces in a substantially tangential direction.

18. In a conduit fish-wire machine, the combination of a clamp having a single axis of rotation and provided at its periphery with opposing wire gripping surfaces, means to direct the fish-wire between said surfaces substantially tangentially of the clamp, and means to adjust the gripping action of the clamp on the wire.

19. In a conduit fish-wire machine, a rotary wire driving clamp having opposed coaxial wire gripping members, and a guide to retain the wire between said members, said guide being adjustable toward and away from the clamp, as described.

20. In a conduit fish-wire machine, a rotary clamp having opposed substantially flat gripping surfaces, a flat fish-wire, and means to store said fish-wire in position for the same to be fed forward or retracted by a gripping thereof between said surfaces.

21. In a conduit fish wire machine, a rotary fish-wire clamp having a single axis of rotation, in combination with a fish wire guide coacting with said clamp, and means to store the fish wire in operative relation to said clamp and said guide.

22. In a conduit fish wire machine, a portable frame, a rotary clamp on said frame, comprising opposing disk-like members rotatable about a common axis, and means to guide the fish wire between said members.

23. In a conduit fish wire machine, a portable frame, a rotary clamp on said frame, comprising opposing disk-like members having a common axis of rotation, means to guide the fish wire between said members, and means to adjust said members relatively to each other to alter the gripping action thereof on the fish wire.

24. In a conduit fish-wire machine, a frame, a disk-like member journaled therein, means to press the fish-wire against a side face of said member, and means to guide the fish-wire with respect to said member.

25. In a conduit fish-wire machine, a portable frame, a disk-like member journaled therein, means to press the fish-wire against a side face of said member adjacent the periphery thereof, means to alter the pressure of said last named means on the fish-wire, and means to guide the fish-wire in a definite path with respect to said member.

26. In a conduit fish-wire machine, the combination of a portable frame, a rotary single axis clamp journaled therein, to move the fish-wire in opposite directions respectively, and a guide interposed between said devices and operative to conduct the fish-wire to one of the same in a substantially tangential direction.

27. In a conduit fish-wire machine, the combination of a portable frame, a rotary single axis clamp journaled therein, to move the fish-wire in opposite directions respectively, a guide interposed between said devices and operative to conduct the fish-wire to one of the same in a substantially tangential direction, and a flexible manipulating member leading from said guide.

28. In a conduit fish-wire machine, the combination of a frame, a rotary single axis wire moving clamp journaled therein, and a crank adapted for use with either of said devices to move the fish-wire in opposite directions respectively.

In testimony whereof, I have hereunto set my hand at Los Angeles, California, this 2d day of September, 1909.

FRANK CRAWFORD.

In presence of—
JAMES R. TOWNSEND,
L. BELLE RICE.